June 6, 1961 — G. H. FROHRING — 2,986,776
INJECTION MOLDING MACHINE AND VALVE THEREFOR
Filed Sept. 11, 1958 — 4 Sheets-Sheet 1
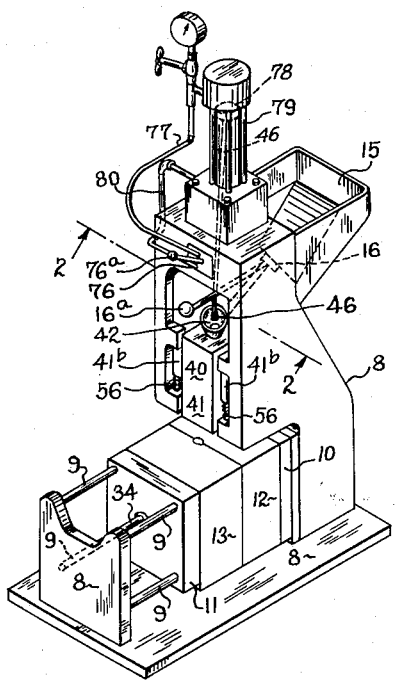
Fig 1
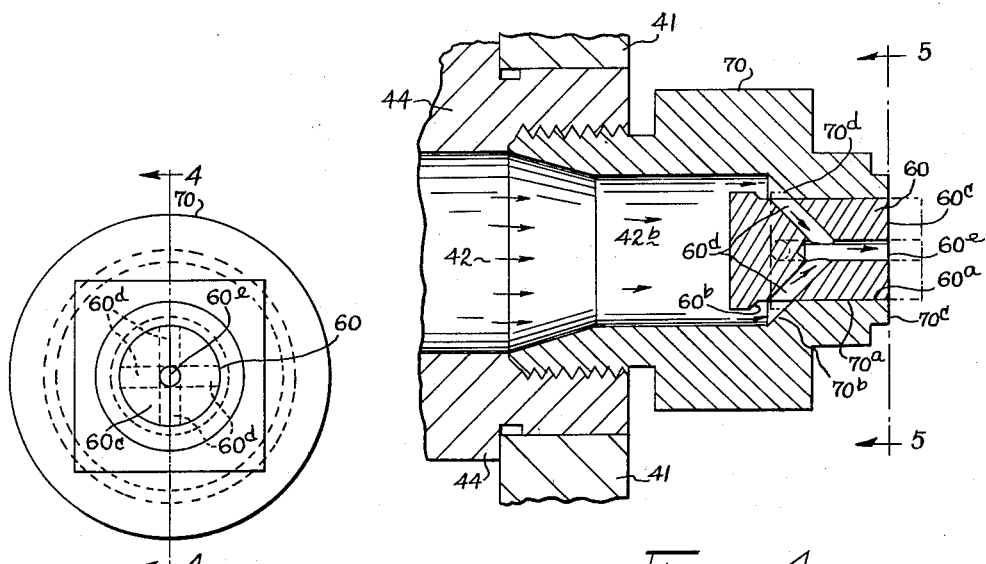
Fig 5
Fig 4
INVENTOR.
GLENN H. FROHRING
BY
Hyde, Meyer, Baldwin & Doran
ATTORNEYS

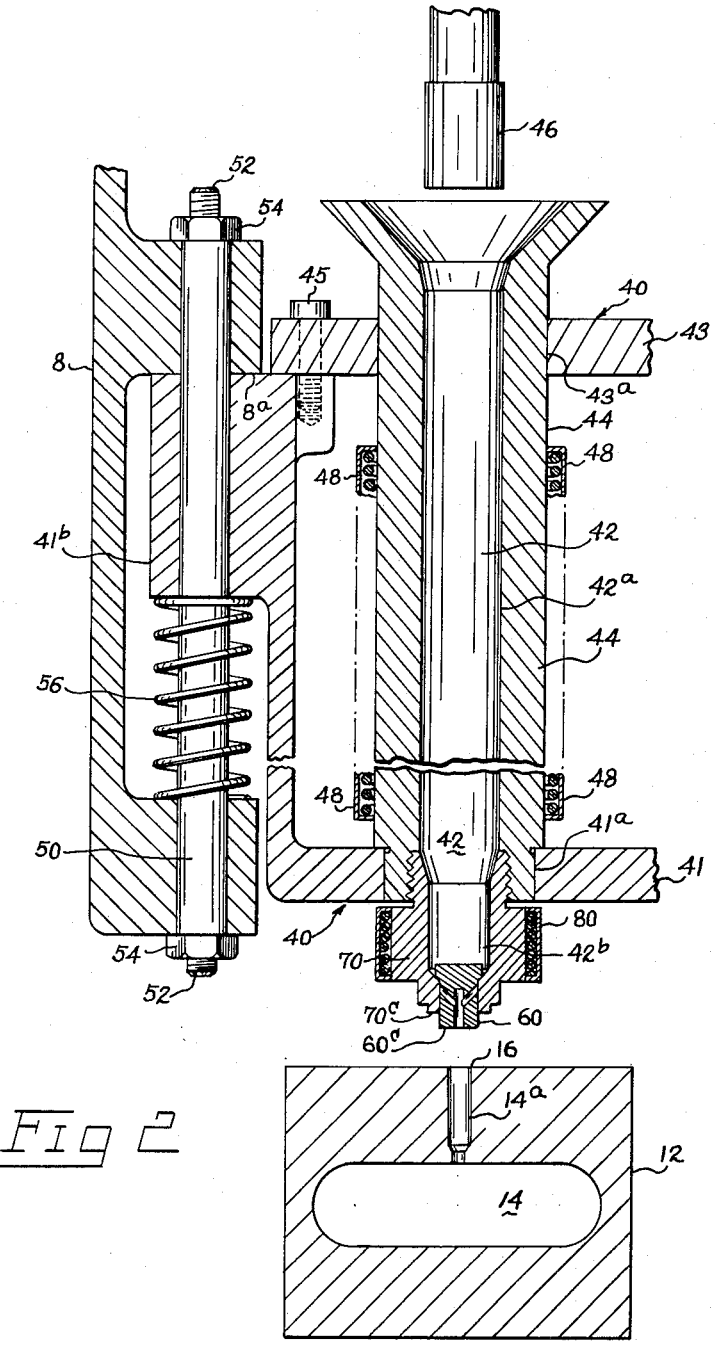

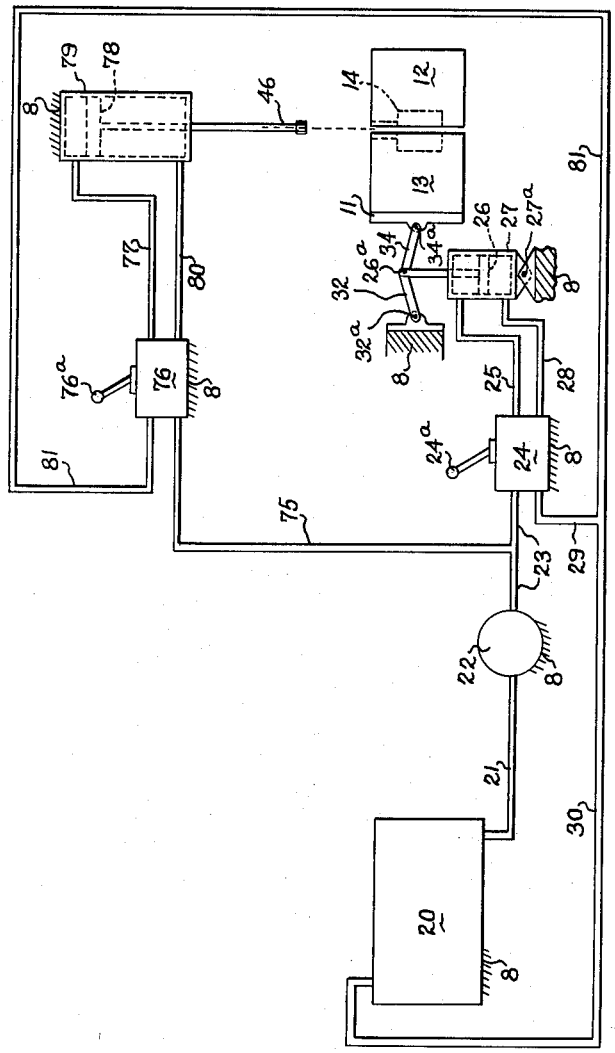

United States Patent Office 2,986,776
Patented June 6, 1961

2,986,776
INJECTION MOLDING MACHINE AND
VALVE THEREFOR
Glenn H. Frohring, Newbury Township, Geauga County, Ohio, assignor to Newbury Industries, Inc., Newbury, Ohio, a corporation of Ohio
Filed Sept. 11, 1958, Ser. No. 760,327
1 Claim. (Cl. 18—30)

This invention relates to improvements in an injection molding machine and/or a nozzle or valve therefor and more particularly to combined non-drooling nozzle and valve and actuating structure for an injection molding machine.

One of the objects of the present invention is to provide a molding fluid injection assembly having a non-drooling nozzle or valve.

A further object of the present invention is to provide a molding fluid injection assembly and/or molding machine having a valve movable between a flow cut-off position and a fluid injecting flow position; and having valve actuating means responsive to relative movement in one direction for moving the valve from flow cut-off to fluid injecting flow position, effective on pressure or suitable valve moving means for moving the valve between these positions, and/or responsive to relative movement in the other direction for moving the valve from fluid injecting flow to flow cut-off position.

A further object of the present invention is to provide a one piece nozzle and valve member in a molding fluid injection assembly.

A further object of the present invention is to provide heating means closely associated with a valve or nozzle in a molding fluid injection assembly and/or molding machine for supplying heat to the molding material to maintain proper fluid viscosity for proper functioning of the valve or nozzle.

A further object of the present invention is to provide a molding machine with a chamber, a nozzle, a feeding means, nozzle advancing means and nozzle retracting means with two or three of said means including means for applying pressure in said chamber to cause the operation of said two or three means and/or to provide a valve means operable by said pressure in said chamber, whereby the operations sequentially performed in response to said pressure by suitable control means include one or more of the following operations: nozzle advance, valve opening, material feeding through the nozzle, valve closing, and nozzle retraction.

A further object of the present invention is to provide a mechanism characterized by its structural simplicity, economy of manufacture, compactness of design, ease of assembly of its components parts, strong and sturdy nature, operating efficiency, ease of operation or use, desirable advantages for injection molding, and many functions performed by one-piece members, such as a feeding ram.

Other features of this invention reside in the arrangement of and design of the parts for carrying out their appropriate functions.

Other objects and advantages of this invention will be apparent from the accompanying drawings and description and the essential features will be set forth in the appended claim.

In the drawings:

FIG. 1 is a perspective view of one form of injection molding machine containing the persent invention;

FIG. 2 is a sectional view taken generally along the line 2—2 of FIG. 1 showing in its lower portion the closed mold cavity and in its upper portion the molding fluid injection assembly in its flow cut-off position;

FIG. 4 is a longitudinal sectional view of the portion of the assembly shown in FIG 3 taken along the line 4—4 of FIG 5;

FIG. 5 is a bottom plan view taken along the line 5—5 in FIG. 4 of the molding fluid injection assembly in FIG. 1 with the encircling heater band removed; while FIG. 6 is a simplified pressure fluid flow diagram for actuating the components of the machine.

Figure 3:
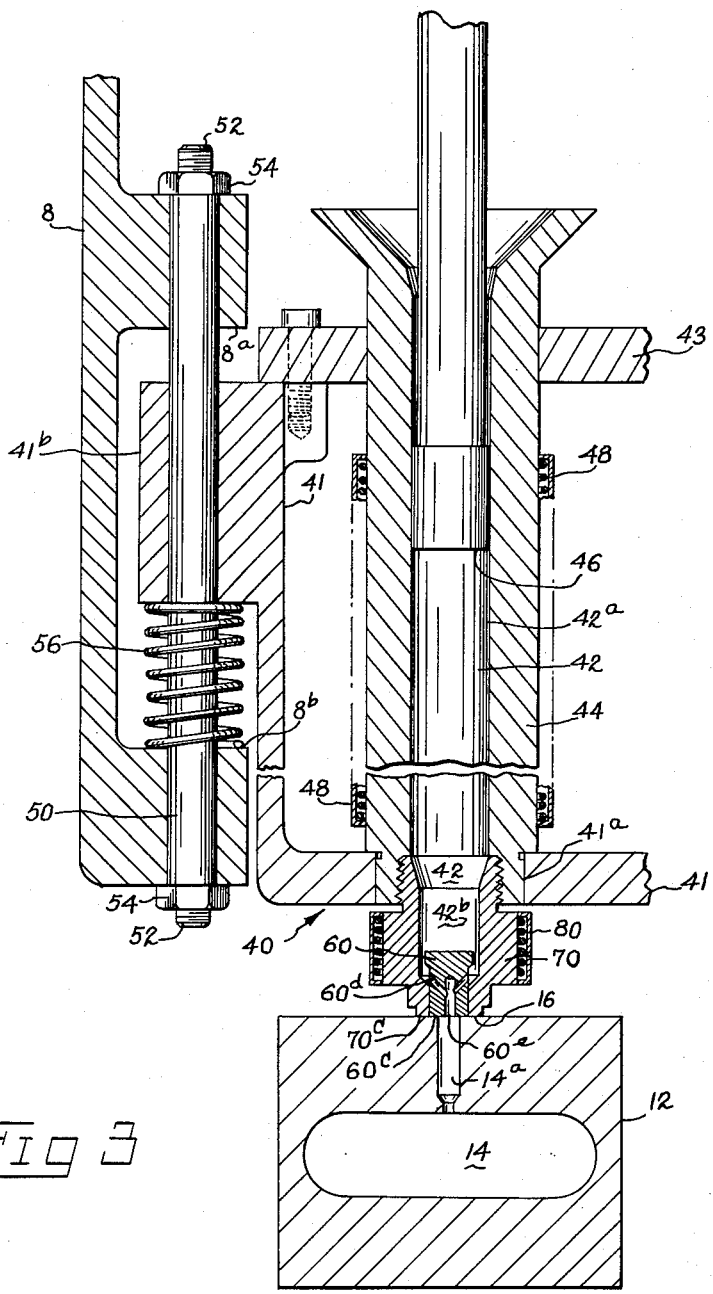
FIG. 3 is a sectional view taken generally along the line 2—2 of FIG. 1 showing the molding fluid injection assembly moved downwardly against the mold and in its fluid injecting flow position for filling the mold cavity.

Before the apparatus here illustrated is specifically described, it is to be understood that the invention here involved is not limited to the structural details or arrangement of parts here shown since mechanisms embodying the persent invention may take various forms. It is also to be understood that the phraseology or terminology herein employed is for purposes of description and not of limitation since the scope of the present invention is denoted by the appended claim.

The present invention is specifically directed to the mechanism in FIGS. 2 and 3 and to the valve and nozzle structure located at the lower end of the heater box or molding fluid injection assembly in FIGS. 2 and 3 located immediately above the mold. This valve and nozzle structure is a non-drooling construction especially desirable for use in molding nylon but also having advantages in use for molding other materials. If a non-drooling construction were not used, the nylon drool would prevent resealing between the injection nozzle and the mold inlet, as has been frequently found in practice.

While the present invention might be carried out on any suitable injection molding machine, one type of conventional molding machine has been illustrated and will be described to provide background for the present invention. This molding machine includes a frame 8 in FIGS. 1, 2, 3 and 6 having four parallel rails 9 supporting two relatively movable platens 10 and 11 in FIG. 1 adapted for opening and closing the mold cavity 14 by their relative movement with these platens here designated for purposes of illustration only as fixed platen 10 and movable platen 11 respectively secured against movement on and slidable on rails 9. Manual operation or any suitable means, as found on any conventional injection molding machine, may be used for moving movable platen 11 toward the left away from fixed platen 10 to a mold open-position for cavity 14 so that the molded article in this cavity may be removed, and this manual operation or means also may be used for moving the platen 11 toward the right to the illustrated mold cavity closed position for the next injection molding operation with each of these movements taking place at suitable times in the injection molding cycle. One suitable platen moving means is schematically shown in the present application in FIG. 6 wherein fluid, such as oil, is pumped under pressure from storage tank 20 through line 21 by pump 22 through line 23 to conventional valve 24 controlled by handle 24a. When handle 24a is in one position, fluid under pressure travels from line 23 to valve 24, line 25, and the upper end of cylinder 27, while fluid in the lower end of cylinder 27 is returned from cylinder 27 to line 28, valve 24, lines 29 and 30, and tank 20. Then, the fluid will move piston 26 downwardly to close the mold by moving platen 11 toward the right in FIG. 6 by pulling downwardly on toggle links 32 and 34. Pivots 27a, 32a and 34a respectively pivotally connect cylinder 27 and link 32 to the frame 8 and link 34 to platen 11, while pivot 26a pivotally connects links 32 and 34 and piston 26. The mold may be opened by moving handle 24a to another position so as to reverse the flow in lines 25 and 28 with lines 23 and 28 connected and with lines 25 and 29 connected so that piston 26 will move upwardly and platen 11 will move toward the left to open the mold.

Platens 10 and 11 have detachably secured thereto respectively the conventional mold blocks 12 and 13 having registering recesses for forming in the closed position the mold cavity 14 for forming the article to be molded. This cavity 14 is completely closed around its periphery except for a mold inlet 14a in FIGS. 2 and 3 for injection of the molding material therein.

The drawing figures illustrate a heater box or molding fluid injection assembly 40 for injecting or cutting off molding fluid flow through nozzle discharge port 60e in FIG. 3 into mold cavity 14 through mold inlet 14a with this nozzle discharge port 60e being a non-drooling nozzle port. Assembly 40 has a sleeve 44, has a housing 41 with an upwardly opening recess therein housing sleeve 44, and has a plate 43, secured to housing 41 by a plurality of screws 45, covering the open top of housing 41. Sleeve 44 is frictionally supported in circular bores 41a and 43a respectively of housing 41 and plate 43 so that housing 41, plate 43 and sleeve 44 are rigidly connected together to form a portion of assembly 40 and to move vertically as a unit with the two opposite sleeve portions 41b, 41b of housing 41 vertically slidable on parallel guide rods or sleeves 50 straddling cylinder 44 with each sleeve 50 secured to frame 8 by an end threaded stud 52 telescoped through sleeve 50 and locked to frame 8 by two end nuts 54, 54. Each sleeve 50 has a compression, helical spring 56 telescoped thereover and located between the lower surface of sleeve portion 41b and frame 8 for pushing portion 41b upwardly against frame surface 8a as an upper limit stop.

Assembly 40 has a heating chamber 42 for molding material storage and heat up with this heating chamber having an annular surface and with the chamber comprising chamber portions 42a and 42b. Sleeve 44 has a bore providing chamber portion 42a. Sleeve 44 of assembly 40 may be of any suitable construction but is preferably provided with at least one heater band 48 surrounding sleeve or cylinder 44 and controlled by a thermostat to keep the molding material in chamber 42 at proper temperature.

Solid plastic, in finely divided form, is fed by gravity in FIG. 1 from a hopper 15, by opening control valve 16 by handle 16a, into the funnel shaped upper end of chamber 42 just below ram or piston 46.

Manual operation or suitable means, as found on a conventional molding machine, may be used for reciprocating the ram or piston 46 in a vertical direction upwardly and downwardly in timed relationship with the closing of the mold platens 10 and 11. One suitable piston moving means is shown in FIG. 6. Fluid is pumped under pressure from pump 22 to line 23, line 75, conventional valve 76 identical to previously described valve 24, line 77 and the top of cylinder 79; while fluid from the lower end of cylinder 79 is returned to line 80, valve 76, lines 81 and 30, and storage tank 20. Then, piston 78, and ram or piston 46 secured to piston 78, are moved downwardly. To raise piston 46, the flow is reversed in lines 77 and 80 with lines 75 and 80 being connected and with lines 77 and 81 being connected respectively in flow communication by moving control handle 76a for valve 76 to a reversed position. Valve handle 76a also has a neutral position wherein no flow takes place in lines 77 and 80, and the fluid in these lines is locked therein, so ram 46 will remain in any desired position. As ram 46 moves downwardly, it pushes the solid, finely divided synthetic resin material into the heating chamber 42, where it gradually becomes a flowable fluid by the heating from electrical heater band 48 as the material moves downwardly in chamber 42. The fluid pressure from this ram or piston 46 forces the molding material from chamber 42 through nozzle discharge port 60e as molding fluid for injection through mold inlet 14a into mold cavity 14.

The lower end of assembly 40 includes a nozzle plug 60 and a connecting member 70 with member 70 slidably receiving in a bore at its lower end plug 60 and attached at its upper end by screw threads to a threaded bore of sleeve or cylinder 44.

The nozzle plug 60 is a flow controller and nozzle member or mechanism movable between a fluid injection flow position shown in FIG. 3 and a flow cut-off position shown in FIG. 2 for respectively permitting and preventing fluid flow from chamber 42 through nozzle discharge 60e into mold inlet 14a. This flow controller and nozzle member or mechanism 60 includes integrally formed in one member in FIG. 4 an annular and peripheral guide surface portion 60a cylindrical in form, an annular and conical controller stop surface portion 60b, a planar zone engaging surface portion 60c, a plurality of inlet ports 60d (here shown as four in number in FIG. 5) in flow communication with axially extending nozzle discharge port 60e with these ports and connecting passageways permitting fluid injection from chamber 42 into mold cavity 14 through mold inlet 14a when the component parts are in the FIG. 3 position, which is the fluid injecting flow position. Connecting member or mechanism 70 has integrally formed as a part thereof an annular and cylindrical guide surface portion 70a in FIG. 4, an annular and conical base stop surface portion 70b, a planar and annular zone engaging surface portion 70c, an annular fluid flow cut-off surface portion 70d made up of portions of either or both surface portions 70a and 70b, and an annular bore surface 42b forming a portion of chamber 42. The connecting member 70 coacts with the flow controller and nozzle member 60 as a base member of a flow controller valve having member 60 movable between FIG. 2 and FIG. 3 positions. These members 60 and 70 are telescopically related on guide surface portions 60a and 70a for axial travel of member 60 in opposite directions (upwardly and downwardly) on these guide surface portions.

The molding cycle operation takes place in five sequential operational or method steps with these steps being sequentially performed with some or all steps performed by any suitable conventional mechanism, with power or manual movement, or by manual movement of the components parts.

First, the die is closed by moving platen 11, by approach movement, toward fixed platen 10 to the mold closed position in FIGS. 1, 2 and 3 to form cavity 14 to receive the molding fluid. During and prior to this operational step, ram 46 is at the upward end of its stroke relative to sleeve 44 and is completely withdrawn from chamber 42. Then, assembly 40 is in the flow cut-off position of FIG. 2 with fluid flow cut-off surface portion 70d in FIG. 4 cutting off flow through inlet ports 60d, with stop surface portions 60b and 70b engaged and forming a fluid seal, and with zone engaging portion 70c extending downwardly beyond zone engaging portion 70c in FIG. 2 instead of being in coplanar relationship thereto, as shown in FIGS. 3 and 4. Then, since inlet ports 60d are closed in FIG. 2, the molding fluid in chamber 42 will not flow downwardly out of nozzle discharge port 60e. Plug 60 is held firmly seated in member 70 to cause this flow cut off. Members 60 and 70 are held in this position by the weight of the plasticized material in chamber 42 pressing plug 60 downwardly and by the mass of plug 60 with the loose tolerance between guide surface portions 60a and 70a permitting plug 60 to seat.

Also, when ram 46 is in this withdrawn position, plastic pellets may be loaded by gravity into the top of chamber 42 by manually actuating in FIG. 1 the handle 16a of any suitable valve 16 controlling the gravity flow of pellets from pellet hopper 15 by a trough to the funnel shaped upper end of chamber 42.

Second, assembly 40 is moved downwardly from the FIG. 2 position to the FIG. 3 position into contacting association with zone 16 associated with the closed mold by suitable advancing movement means for causing relative advancing movement between nozzle 60 and mold 12, 13 into contact between nozzle 60 and inlet 14a. When valve 76 in FIG. 6 is actuated by manual movement of its handle 76a, pressure fluid is admitted to the top of cylinder 79 to move ram 46 downwardly into chamber 42. When ram 46 meets the resistance of the material in chamber 42, pressure is applied to the material in chamber 42 and assembly 40 moves downwardly from the FIG. 2 to FIG. 3 position, while compressing springs 56 against frame surface 8b, until assembly 40 seats against mold zone 16. Hence, the relative approach movement of nozzle 60 and mold 12, 13 is in response to the pressure increase in chamber 42. This method of movement causes zone engaging portions 60c and 70c to be moved into coplanar relationship by the planar surface of zone 16, here shown as a portion of the exterior surface of mold blocks 12 and 13 adjacent mold inlet 14a. Hence, flow controller member 60 is moved from the flow cut-off position in FIG 2 to the fluid injecting flow position in FIG. 3 as a result of this movement with the valve actuation being responsive to the relative approach movement in the downward direction of sleeve 44 and member 70 of assembly 40 relative to zone 16 for moving the flow controller member 60 from the flow cut-off position in FIG. 2 to the fluid injecting flow position in FIG. 3. Then, the inlet ports 60d of this controller member 60 are in communication with the material within chamber 42.

Third, ram or piston 46 continues moving in the downward direction as a pressure means to apply pressure for forcing the molding material from chamber 42 by fluid pressure downwardly through inlet ports 60d, nozzle discharge port 60e, and mold inlet 14a into mold cavity 14 for injecting molding fluid while assembly 40 is in the fluid injecting flow position of FIG. 3. Ram 46 is shown in FIG. 3 at the lower end of its stroke relative to sleeve 42. Hence, pressure increase in chamber 42 sequentially advances nozzle 60 into contact with mold inlet 14a, moves plug 60 to open or flow position, and feeds the material through nozzle 60.

Fourth, assembly 40 is moved in the upward direction rapidly from the FIG. 3 to the FIG. 2 position in the preferred method of operation while platens 10 and 11 remain in the mold closed position illustrated. As ram 46 moves upwardly from the FIG. 3 to the upward, withdrawn or its original position relative to chamber 42 shown in FIG. 2, the compressed springs 56 force assembly 40 to move upwardly to reutrn ultimately to the initial or neutral position in FIG. 2 as the ram 46 releases its pressure on the material in chamber 42. This provides a retraction movement means for causing relative separation movement between and into spaced relationship of nozzle 60 and mold 12, 13 by the upward movement of ram 46, previously used to apply pressure to the material in chamber 42. During or after this upward movement, the valve automatically closes, when member 70 is spaced from zone 16 at least the distance between surfaces 60c and 70c in FIG. 2, because member 60 is moved downwardly relative to member 70 from the FIG. 3 to the FIG. 2 position to cut-off the flow through the non-drooling nozzle outlet port 60e. As or after member 70 is moved upwardly away from zone 16 by the upward bias of springs 56, plug 60 is moved downwardly relative to member 70 to the closed or flow cut off position by the weight of the residual material in chamber 42 exerting downward pressure on plug 60 and by the mass of plug 60. Hence, this relative separation movement between nozzle 60 and inlet 14a and this closing of valve 60, 70 takes place in response to the pressure decrease in chamber 42.

Hence, ram 46 controls the feeding pressure in chamber 42; controls the relative position of valve members 60, 70; controls the position of nozzle 60 relative to mold inlet 14a; and always urges valve members 60 and 70 into more tightly closed position when high pressure is in chamber 42. Hence, the machine illustrated in the drawings has a control means (including the valve, feeding, nozzle advancing, and nozzle retracting means) for sequentially advancing the nozzle 60 into mold contact at inlet 14a, moving the valve means to injection flow position, feeding the material into the mold cavity 14, retracting nozzle 60, and closing the valve means.

The aforementioned space relationship between surface 70c and zone 16 is effective to permit downward closing pressure to be exerted on plug 60 by the mass of plug 60 and the weight of the fluid in chamber 42, or by any other suitable valve pressure or valve moving means, to move the valve means from the fluid injecting flow position of FIG. 3 to the flow cut-off position of FIG. 2. Members 60 and 70 are moved from the FIG. 3 to the FIG. 2 relative axial relationship by upward movement of member 70 from the FIG. 3 position to separate member 70 from zone 16 until members 60 and 70 bear the relative axial relationship shown in FIG. 2. The valve pressure or valve moving means is shown in its preferred form in the drawings as causing this movement of member 60 from the FIG. 3 to the FIG. 2 position by the pressure of the fluid within chamber 42 during or after the upward movement stroke by member 70 of assembly 40.

Suitable modification may be made in the valve pressure or moving means within the scope of the invention and the relative movements of members 60 and 70 will still be the same to effect closed and open positions. This valve pressure or moving means may be of any suitable type, such as a spring located outside or inside chamber 42 and biasing member 60 downwardly relative to member 70 after disengagement of zone engaging surface 70c from zone 16 during this upward movement. This valve closing pressure within chamber 42 may be caused by any suitable method: (1) the downward pressure of residual fluid within chamber 42, as previously described, (2) by holding piston 46 stationary during some portion of the upward movement of sleeve 44 by springs 56, and/or (3) moving piston 46 momentarily in the downward direction relative to sleeve 44 at the appropriate time (after surface 70c is spaced upwardly from zone surface 16 at least the axial distance shown between surfaces 60c and 70c in FIG. 2) in the operational cycle to create valve closing pressure in chamber 42. In the aforementioned methods (2) and (3), piston 46 adds to the valve closing pressure of the material within chamber 42 if greater force is required to move plug 60 from the FIG. 3 to FIG. 2 position.

If any one of or any combination of these aforedescribed methods are used, the mode of operation will be basically the same with the pressure within chamber 42 and the mass of member 60 forcing member 60 downwardly relative to member 70 from the FIG. 3 to the FIG. 2 position and with the fluid taking up the previous displacement of member 60 within chamber 42 as member 60 moves between these positions. Hence, the valve means is movable from the FIG. 3 to the FIG. 2 position by suitable valve actuating means effective upon suitable valve pressure or valve moving means, here shown as the pressure within chamber 42 exerted by the fluid within chamber 42 and as the mass of member 60, and responsive to relative separation movement of assembly 40 and the closed mold zone 16 when sleeve 44 and member 70 move in the opposite or upward direction relative to zone 16. As member 60 approaches the FIG. 2 position, stop surface portions 60b and 70b engage to stop downward relative travel of member 60 with respect to member 70 and to establish the FIG. 2 position. Also, flow cut-off surface portion 70d cuts off fluid flow through inlet port 60d.

It should also be apparent that valve members 60 and 70 will move between their illustrated positions if sleeve 44 is moved up and down between the FIG. 2 and 3 positions by any suitable means without the aid of ram 46.

The valve movement will still be caused by the pressure weight of the material in chamber 42 and the mass of plug 60.

Fifth, after assembly 40 reaches the FIG. 2 position, die platens 10 and 11 and the mold are opened by actuating valve handle 24a in FIG. 1 to cause separating movement with movable platen 11 moving toward the left from the FIG. 2 position so that the molded article may be removed from the mold cavity 14.

Suitable heating means, here shown as including heater bands 48 and 80, surround sleeve 44 and member 70. Band 48 is closely associated with the flow controller and nozzle member 60 for supplying heat to the molding material to maintain proper fluid viscosity in the nozzle port 60e, fluid inlet ports 60d, the connecting passageways between these ports, and the lower end of chamber 42 for proper functioning of the valve means for movement between the FIG. 2 and FIG. 3 positions and for giving the nozzle port 60e its non-drooling feature. The heating means may include a suitable electrical source and electrical control for heater band 80 for careful and accurate temperature control at the lower end of assembly 40. This control may include in the electrical circuit a thermostat responsive to the temperature of the molding fluid in the lower end of chamber 42, a manually controlled rheostat for controlling the heat, or any suitable combination of the thermostat and rheostat.

This disclosed construction has many advantages. First, member 60 is automatically movable between the flow cut-off position in FIG. 2 and the fluid injecting flow position in FIG. 3 in response to the normal approach and separation movement of assembly 40 relative to zone 16 on the closed mold and to the pressure within chamber 42.

Second, this is a simple construction, inexpensive to manufacture, and providing a multiplicity of functional advantages. The two relatively movable and coacting members 60 and 70 provide the nozzle means, valve means and valve actuating means contacting mold zone 16. Also, ram 46 provides many functions. The valve moving means or valve pressure means for moving member 60 between closed and open positions (FIG. 2 and FIG. 3); the feeding means or fluid pressure means for forcing the molding material from chamber 42 through nozzle 60 into mold cavity 14; and the advancing and retracting means for moving nozzle 60 and assembly 40 down and up relative to zone 16 each have common piston or ram 46 for exerting pressure on the fluid in chamber 42 for providing this fluid injection pressure; through the fluid in chamber 42 against valve members 60 and 70, for providing the valve actuating pressure; and against sleeve 44, springs 56 and member 70, for providing vertical movement of assembly 40.

Third, nozzle discharge port 60e is a non-drooling nozzle especially desirable for use in molding nylon products but also good for use in molding other type products. Since it is non-drooling, there will be no excess material on surface portion 60c preventing proper sealing action between surface portion 60c and zone 16 in the next molding cycle. Also, the top of the sprue in mold inlet 14a at zone 16 will be clean and sharp with no string, lamination, or other evidence of frozen material. Heater band 80 assures that the nozzle means and valve means will function properly by holding the material therein, and at the lower end of chamber 42, in a sufficiently liquid state to permit the disclosed movement of member 60 relative to member 70 and to hold the molding fluid ready for the next short or injection in a heated zone until the instant of injection. The quality of the material delivered to the mold cavity 14 is not reduced by exposure to a cold nozzle or sprue bushing or by unheated or undesirable restrictions in the nozzle. In molding nylon parts with the disclosed construction, it has been found that they can be molded whiter, denser, and more resilient with less waste, fewer skilled operators and a minimum of operator supervision.

Various changes in details and arrangement of parts can be made by one skilled in the art without departing from either the spirit of this invention or the scope of the appended claim.

What is claimed is:

A molding fluid injection assembly with a non-drooling nozzle for coacting with a zone associated with a mold and for injecting or cutting off molding fluid flow into a mold inlet, comprising a frame; a chamber member having a cylindrical chamber for molding material storage; a nozzle and valve member located at the outlet end of said chamber and movable along a linear path relative to said chamber member between fluid flow cut-off position and fluid injecting flow position for respectively preventing and permitting fluid flow from said chamber through said nozzle and valve member into said mold inlet; a sleeve secured to and located laterally from said chamber member; a guide rod carried by said frame extending telescopically through said sleeve along said linear path and being spaced laterally from said chamber member for permitting said chamber member to move in one direction along said path relative to said mold for moving said nozzle member into mold inlet contact; a spring telescoped over said rod and located laterally of said chamber member between said frame and one side of said sleeve for urging said chamber member in the opposite of said one direction along said path into spaced relationship with said mold inlet; a stop shoulder on said frame engageable with the opopsite side of said sleeve at said spaced relationship to determine this relationship while loading said spring with a predetermined force; said chamber member having at its outlet end two coaxial cylindrical bore surfaces of larger and smaller diameter joined by a conical bore surface; said nozzle and valve member being a one-piece member hraving an integral cylindrical peripheral surface endwise sliding in the smaller diameter bore surface between said positions, having an integral conical peripheral surface engageable along its full length with said conical bore surface to cut-off flow from said chamber in said flow cut-off position, having an integral bottomed bore having a circular nozzle discharge port at one end and extending axially a portion of the distance through said member toward said chamber, having a plurality of integral diagonal bores extending from said bottomed bore to inlet ports at said cylindrical surface with said bores being inclined at approximately the same angle as said conical surfaces so as to provide in the flow position a smooth and non-drooling flow projection of said conical bore surface from said chamber into said diagonal bores, and having said nozzle discharge port flush with the end of said smaller diameter chamber bore in said flow position and protruding outwardly therefrom in said cut-off position; heating means rigidly secured in good thermal contact with said chamber member and surrounding said nozzle and valve member and located transverse to the flow therethrough for supplying heat to the material in said chamber to maintain proper fluid viscosity in said nozzle and valve member for proper functioning thereof; means for moving said piston in said chamber in said one direction for increasing pressure in said chamber for sequentially relatively advancing said nozzle member and mold by relative advancing movement in said one direction against the resilient bias of said spring until said nozzle member and said inlet are in contact, for moving said valve member from flow cut-off to flow position until said chamber member contacts said inlet, and for feeding said material from said chamber through said nozzle member into said mold; and means for sequentially relatively separating by the resilient bias of said spring said chamber member and mold by relative separating movement in said other direction, and for moving said valve member from flow to flow cut-off position; said last mentioned means including means for moving said piston in said opposite direction for decreasing the pressure in said chamber.

References Cited in the file of this patent

UNITED STATES PATENTS

| | | |
|---|---|---|
| 2,433,654 | Dinzl | Dec. 30, 1947 |
| 2,565,522 | Renier | Aug. 28, 1951 |
| 2,834,050 | Dymsza et al. | May 13, 1958 |

FOREIGN PATENTS

| | | |
|---|---|---|
| 751,716 | Great Britain | July 4, 1956 |